July 4, 1950 E. M. DELORAINE ET AL 2,513,291

MULTIPLEX PULSE TIME DEMODULATOR

Original Filed Oct. 19, 1943 5 Sheets-Sheet 1

INVENTORS
EDMOND M. DELORAINE
JUSTIN L. FEARING

BY Percy P. Lantzy
ATTORNEY

July 4, 1950 E. M. DELORAINE ET AL 2,513,291

MULTIPLEX PULSE TIME DEMODULATOR

Original Filed Oct. 19, 1943

5 Sheets-Sheet 2

INVENTORS
EDMOND M. DELORAINE
JUSTIN L. FEARING
BY Percy P. Lantzy
ATTORNEY

July 4, 1950 E. M. DELORAINE ET AL 2,513,291

MULTIPLEX PULSE TIME DEMODULATOR

Original Filed Oct. 19, 1943 5 Sheets-Sheet 3

INVENTORS
EDMOND M. DELORAINE
JUSTIN L. FEARING

BY Percy P. Lantzy

ATTORNEY

INVENTORS
EDMOND M. DELORAINE
JUSTIN L. FEARING
BY Percy P. Lantzy
ATTORNEY

INVENTORS
EDMOND M. DELORAINE
JUSTIN L. FEARING
BY
Percy P. Lantzy
ATTORNEY

Patented July 4, 1950 2,513,291

UNITED STATES PATENT OFFICE 2,513,291

MULTIPLEX PULSE TIME DEMODULATOR

Edmond M. Deloraine, Paris, France, and Justin L. Fearing, White Plains, N. Y., assignors to Federal Telephone and Radio Corporation, New York, N. Y., a corporation of Delaware Original application October 19, 1943, Serial No. 506,802. Divided and this application November 3, 1945, Serial No. 626,564

6 Claims. (Cl. 179—15)

This invention relates to multiplex communication systems and methods utilizing electrical pulses, and particularly to a receiver system for separating and demodulating a multi-channel train of signal modulated pulses.

This is a division of our copending application, Serial No. 506,802, filed October 19, 1943, now U. S. Patent No. 2,429,613, granted Oct. 28, 1947.

In the United States patent to E. M. Deloraine-A. H. Reeves No. 2,262,838 and the corresponding British Patent No. 509,820, a multiplex signalling system utilizing time modulation of electrical pulses as distinguished from amplitude modulated pulses is disclosed. In the Deloraine-Reeves system, the signals are transmitted independent of variation of pulse amplitude, the pulses being of small constant width compared with the time interval between successive pulses for the same channel. The time displacement of the pulses is also small and is maintained within limits, the interval of which is small compared to the time intervals between successive pulses. The time intervals between the pulses of a given channel are filled with pulses of other channels for multiplexing purposes. To avoid overlap between the pulses of different channels, the pulses of the several channels are differently timed by a distributor at the sending terminal and the receiving channels at the receiving terminal are synchronized therewith by a second distributor which is locked in step with the first distributor by separate means.

It is an object of this invention to provide a further multiplex pulse signalling system and in particular, an improved receiver for the multi-channel train of signal pulses.

Another object of this invention is to provide a method and means for separating the pulses per channel and to demodulate the pulses during the separating operation.

Another object is to provide an improved method and means for demodulating for time modulated pulses.

In accordance with the multiplexing principles of the present invention, a plurality of communication channels are provided by producing trains of electrical pulses one such train for each channel. The stations of each terminal of the system are each provided with a transmitting circuit and a receiving circuit, the transmitting circuit being used to generate the pulses for one channel and the receiving circuit being used to receive the pulses of another or return channel. The pulses of each channel preferably are paired off with the pulses of each pair, when unmodulated, having a time interval therebetween smaller than the time interval between succeeding pairs of pulses. The different trains of channel pulses from a terminal are differently timed so that when they are fed to a transmission line they interleave together with a given time spacing between suceeding pulses thereby permitting a given amount of time modulation without interference from pulses of other channels. The paired-off relation of the pulses operates to form distinct groups of the pulses with a characteristic monitoring interval between succeeding groups.

The receiving circuit of each sub-station and trunk line is provided with a gate circuit whereby only those pulses of the desired channel or channels are segregated from the other channel pulses present in the common transmission medium. In order to synchronize the receiving sub-stations and trunk lines with the proper channels, the characteristic grouping of the channel pulses may be utilized, although other synchronizing arrangements may be employed. Where the grouping is separated by a given time interval, a suitable monitoring indicator such as a cathode ray oscillograph together with a phase control device may be used for timing the gate control circuits for the receiving sub-stations and trunk lines. Should one channel be used with a given tone or other marker signal to separate the pulse groups or to designate a given channel in the group, an audible or other form of marker detector may be used in place of or in conjunction with the oscillograph indicator. Regardless of the character of the monitoring device selected, a single monitoring device may be used for each sub-station or trunk line or to control a band of sub-stations, whichever may be desired.

The receiver circuit includes a channel separating and demodulating circuit whereby the pulses of a desired channel are separated from the pulses of other channels and simultaneously demodulated, that is, the time displacement of the pulses is translated into amplitude modulated energy. This separating and demodulation feature, while particularly applicable for separation of channel pulses, is also applicable for demodulation of the pulses of a single channel, the separating function operating to eliminate, to a very large extent, interference occurring between signal pulses. In multi-channel operation, the separating and demodulating circuit includes the production of energy having pedestal-like portions timed to coincide with the pulses of the channel, the separation of which is desired. The pulse portions of the pedestal have a voltage variation characteristic so that when the signal pulses coincide therewith, energy thereof is caused to exceed a given voltage or clipping level whereby a current flow is produced in proportion to the time modulation of the signal pulses. The voltage variation, for example, is preferably inclined so that the time displacement of the signal pulses is translated into a corresponding amplitude modulation signal.

The above and other objects and features of the invention will be understood more clearly upon reference to the following detailed description and accompanying drawings, in which.

Figure 1:
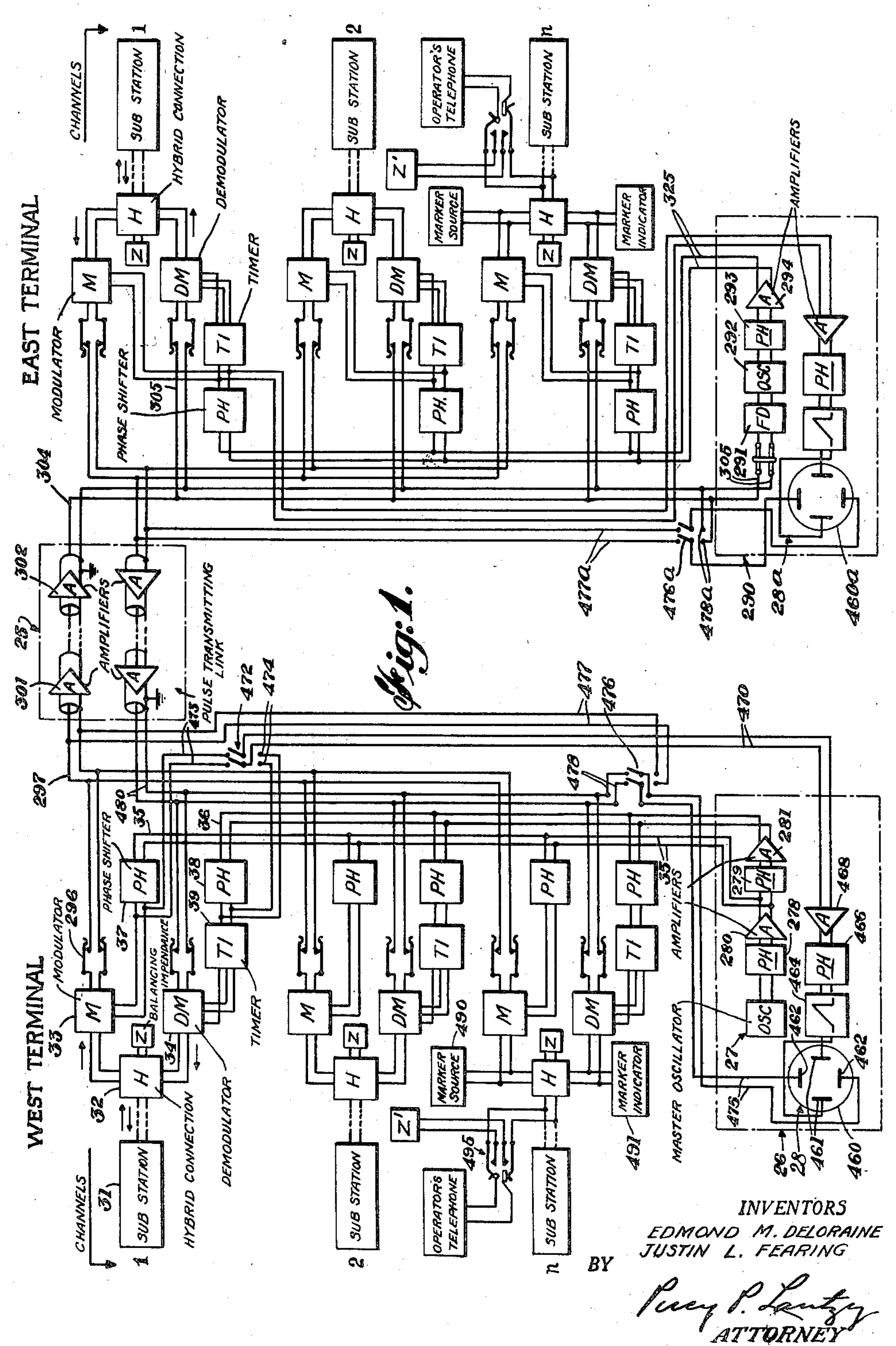
Fig. 1 is a block diagram of a multiplex signalling system provided with west and east terminals in accordance with the principles of our invention.

Referring to Fig. 1 of the drawings, an embodiment of the multiplexing system is shown for purposes of illustrating the principles of the invention. The system shown is provided with two (west and east) terminals interconnected by a transmission link 25.

Each terminal includes a plurality of terminal stations 1, 2 . . . *n*, and an operator's supervisory unit such as unit 26 at the west terminal, which includes a base wave source 27 and a monitoring visual indicator 28. Each terminal station includes a sub-station 31, a modulator 33, a demodulator 34, a hybrid connection 32 connecting the modulator and demodulator to the substation, and two control circuits 35 and 36. The circuit 35 contains a phase shifter 37 by which energy from the master wave source 27 is properly phased for timing of the pulses generated by the modulator 33. The circuit 36 has a phase shifter 38 similar to phase shifter 37 together with a timer circuit 39 for a generation of gate pulses for controlling the operation of demodulator 34.

The sub-station 31 is of known character, such as commonly used for selectively switching in telephone lines and the like for two-way conversation.

The hybrid connection 32 is of known form having a balancing impedance Z whereby signal energy from the sub-station 31 is properly applied to the modulator 33 and signal energy from demodulator 34 is applied to the sub-station 31.

*Modulator circuits*

The modulator 33 may be any one of several forms whereby a train of electrical pulses, either generated by the modulator or by a separate source, is time modulated according to a signal wave. This time modulation of the pulses is preferably biased so that when the pulses of all the channels are mixed together in a common medium, they form distinct groups separated by a monitoring interval of predetermined duration.

Figures 2, 3:
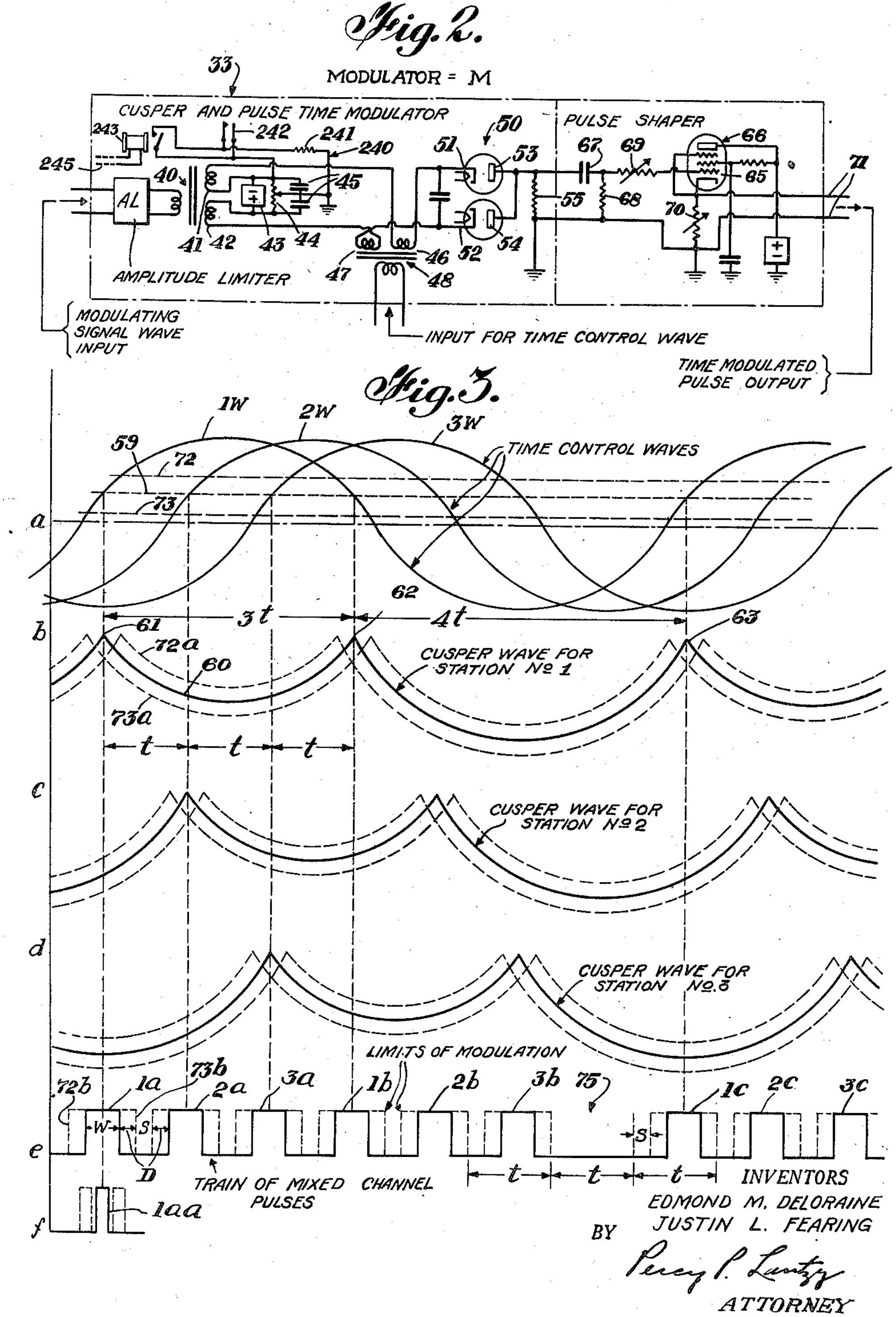
Fig. 2 is a schematic wiring diagram of one of the forms of push-pull modulators that may be used in the multiplex signalling system.
Fig. 3 is a graphical illustration of a set of curves illustrating the pulse generation and modulation timing performed by a group of three modulators of the character shown in Fig. 2.

The pulse time modulator may be any known form and preferably is of the cusper type disclosed in the copending joint application of E. Labin-D. D. Grieg, Serial No. 455,897, filed August 24, 1942, now U. S. Patent No. 2,416,329, granted Feb. 25, 1947. A circuit of the cusper type of modulation is shown in Fig. 2. The modulating signal wave input from sub-station 31 is applied to an amplitude limiter AL which may be of any well known type such as known automatic volume control means adapted to limit the amplitude of waves to a predetermined value. The output of the amplitude limiter AL feeds the primary of a transformer 40 which has a two winding secondary 41, 42. Between the windings 41 and 42 is connected a direct current biasing source of potential 43 having in shunt therewith a potentiometer 44 whose sliding contact is connected to ground. A condenser 45 of negligibly low impedance at speech frequencies is connected between the slider of the potentiometer and each terminal thereof, in order to bypass components of the speech waves and of the channel timing wave around the biasing source. In series with each of the two secondary windings 41 and 42 is connected one of two secondary windings 46 and 47 of an input transformer 48 for the time control wave *lw* (Fig. 3). Each of the secondary windings 46 and 47 of the transformer 48 is connected with one of the cathodes 51 and 52 of a full-wave rectifier 50. Connected across the connections to the cathodes is a capacitor by which the circuits including the transformer secondaries are tuned to the frequency of the time control wave. The anodes 53 and 54 of the rectifier 50 are connected together and through an output resistance 55 to ground.

The operation of the cusper of Fig. 2 will be clear from reference to Fig. 3. The time control wave *lw* (curve *a*) fed over line 35 from phase shifter 37 (Fig. 1) is applied to the primary of the transformer 48 (Fig. 2). The setting of the potentiometer 44 controls the bias on the cusper at a potential level such as indicated at 59 in curve *a*. The full-wave rectification of the wave thus occurs with reference to the level 59 as the axis of rectification thereby producing an output wave 60 having cusps 61, 62, 63, etc., (curve *b*) in the output voltage across resistor 55. These cusps are paired off in time with the interval $3t$ between the cusps of each pair (see pulse pair 61, 62) smaller than the interval $4t$ between succeeding pairs of cusps. The unit $t$ is the time interval allowed for each pulse. This relationship of the two intervals represented by $3t$ and $4t$ is determined by the selected bias on the cusper, the pulse width and the number of channels to be contained in one period of the time control wave *lw*. The relationship shown in Fig. 3 is selected for three channels and the pulse widths produced from the cusps are so selected as to provide for a given degree of time modulation and yet leave a safety interval S between the succeeding channel pulses as indicated at curve *e*. This timing feature will be described in more detail hereinafter.

The output of the cusper is connected through a coupling condenser 67 of low impedance to the cusper waves (curve *b*), a grid leak 68 and a variable resistor 69 to a control grid 65 of vacuum tube 66 of a pulse shaper circuit. In the cathode to ground circuit of the tube 66 is a variable output resistor 70. The screen and suppressor electrodes of the tube are connected in the usual manner, the screen being positively polarized by the anode source and the suppressor grid being connected directly to the cathode. The output conductors 71 for the time modulated pulses are connected across the resistor 70.

The control grid resistor 69 of the shaper may be varied to adjust the positive saturation potential of the tube thereby producing a substantially flat-topped wave in the output, the locking potential of the control grid being adjustable by varying the cathode resistor 70. By adjusting these two resistors in relation to each other it will be seen that the duration of the resulting output pulses may be adjusted between wide limits. The full line rectangular pulse 1*a* in curve *e* of Fig. 3 shows the output pulse corresponding to the cusp 61. The duration of the pulse, however, may be much smaller than shown depending upon the adjustment of resistors 69 and 70. The pulse 1*aa* of curve *f* is illustrative of a smaller width pulse output. It will be understood that the pulse width may be reduced to as small as 1 or 2 microseconds for a timing wave of six kilocycles where 100 channels more or less are desired.

The maximum limits of time displacement of the pulses are controlled by adjustment of the amplitude limiter AL (Fig. 2) and are represented by the levels 72 and 73 in curve *a*. Thus the signal variation of a signal wave causing the axis of rectification 59 to vary between limits 72 and 73 causes the output wave 60 to vary in phase between limits 72*a* and 73*a*. This signal variation causes the output pulse 1*a* produced from the cusp 61 to vary in displacement between the limits 72*b* and 73*b*. These limits are so selected as to allow for the safety interval S between the limits of modulation of the pulses of adjacent channels.

The proportions of the curves of Fig. 3 are exaggerated for clearness of illustration, it being understood, of course, that the undulations of the time control waves have been flattened considerably and that in actual practice they are narrow so that the limits of modulation 72 and 73 extend over a portion of the wave that is substantially linear. It will also be understood that in practice the cusps 61, 62 etc., are sharp and elongated affording a translation thereof into substantially rectangular pulses.

Assume that the west terminal has three stations and that time control waves 1*w*, 2*w* and 3*w* are supplied to the modulators thereof in the timing relation shown in curve *a* of Fig. 3. Three trains of pulses will be produced one for each of the time control waves as indicated by the cusper waves of curves *b*, *c* and *d*. It will be observed that the timing relation of the control waves must be selected according to the pulse width produced and the limits of modulation so as to completely distribute the pulses of the three channels throughout the time intervals corresponding to the smaller undulations of the wave 1*w* with regard to the rectification axis 59. It follows that because of the small and large undulations of waves on opposite sides of axis 59, the pulses of the three channels form groups of six pulses leaving an interval 75 therebetween. For synchronizing purposes it is important that the interval 75 be maintained equal to the interval *t* required for each pulse or a small multiple thereof so that the pulse train may be used at a receiving terminal to control an oscillator or other wave generating circuit tuned to the average repetition rate of the pulses of each group without permitting the wave generating circuit to pull out of step. The monitoring intervals or other intervals caused by the de-energization of terminal stations etc., will not permit loss of synchronism so long as a large percentage of channel pulses are continued or the remaining channel pulses retain the repetition frequency component to which the oscillator at the receiving terminal is tuned.

While an example of the required timing relationship for the pulses of a three channel multiplex system is shown in Fig. 3, it will be understood that these proportions may be varied considerably for different width pulses and for different numbers of channels without departing from the principles of the present system. The pulse width, for example, is shown in curve *e* as W, the pulse being displaceable to the left and right maximum displacements D in response to modulating potentials. This displacement D in each direction is chosen equal to one-half the width W for illustration purposes only, it being understood that many other dimensional relationships may be selected. The safety zone S is arbitrarily selected equal to the width D to provide a margin of safety against encroachment of one pulse upon another, and to provide adequate spacing for segregation of the pulses of one channel from those of other channels at the receiving terminal. The relation of these values for a system containing from 3 to as high as 100 channels, for example, may be expressed as:

$$S=D=\frac{W}{2}$$

and $$t=5D=5S=\frac{5W}{2}$$

For specific examples of timing see the section following entitled "Channel Timing."

It will be observed in Fig. 3 that for three channels the period of wave 1*w* is divided into seven intervals of *t* duration. That is, the period includes twice as many intervals *t* as there are channels plus one interval *t* for the monitoring interval 75. The oscillator 27 (Fig. 1) which may be of any known type of stable oscillator, is preferably adjusted or selected for the frequency necessary depending upon the number of channels required by the system. If desired, a high frequency source may be provided together with a suitable frequency divider to reduce the frequency to that desired substantially as provided at the supervisory unit 290 at the east terminal which is described hereinafter.

*Channel timing*

While a simple example of a three-channel circuit has been described for purposes of illustration in connection with the modulators hereinbefore described, it will be understood that in practice such systems will have a great many more channels. Assume, for example, that the frequency of the base or time control wave used is 6 k. c. and that the system has 99 channels. The monitoring interval will, in such example, be equal to two pulse intervals ($2t$) and the duration of one cycle of the time control wave will equal $2\times99+2$ or $200t$. In other words, each cycle of the time control wave would include 200 pulse intervals with two of such intervals as the monitoring interval (see interval 75, Fig. 3).

Since there are two pulses for each channel per cycle of the time control wave, there are for a 6 k. c. wave 2×6000 or 12,000 pulses per second for each channel. Also, since there are 166⅔ microseconds per cycle in a 6 k. c. wave, each pulse interval t will equal ⅚ of a microsecond. Referring, for example, to the pulse relation illustrated in Fig. 3, W, the duration of each pulse will be ⅓ microsecond; D, the maximum displacement in each direction will be ⅙ microsecond and S, the safety interval will be ⅙ microsecond.

It will be understood that many other channel systems may be worked out according to the principles of this invention, the pulse relation depending upon the number of channels, the wave frequency, the time spacing allowed for the monitoring intervals or signals and the pulse duration, degree of modulation, and safety interval between adjacent channel pulses. For further comment on the timing of channels see the section labelled "Synchronizing."

*Demodulator circuits*

Figure 4:
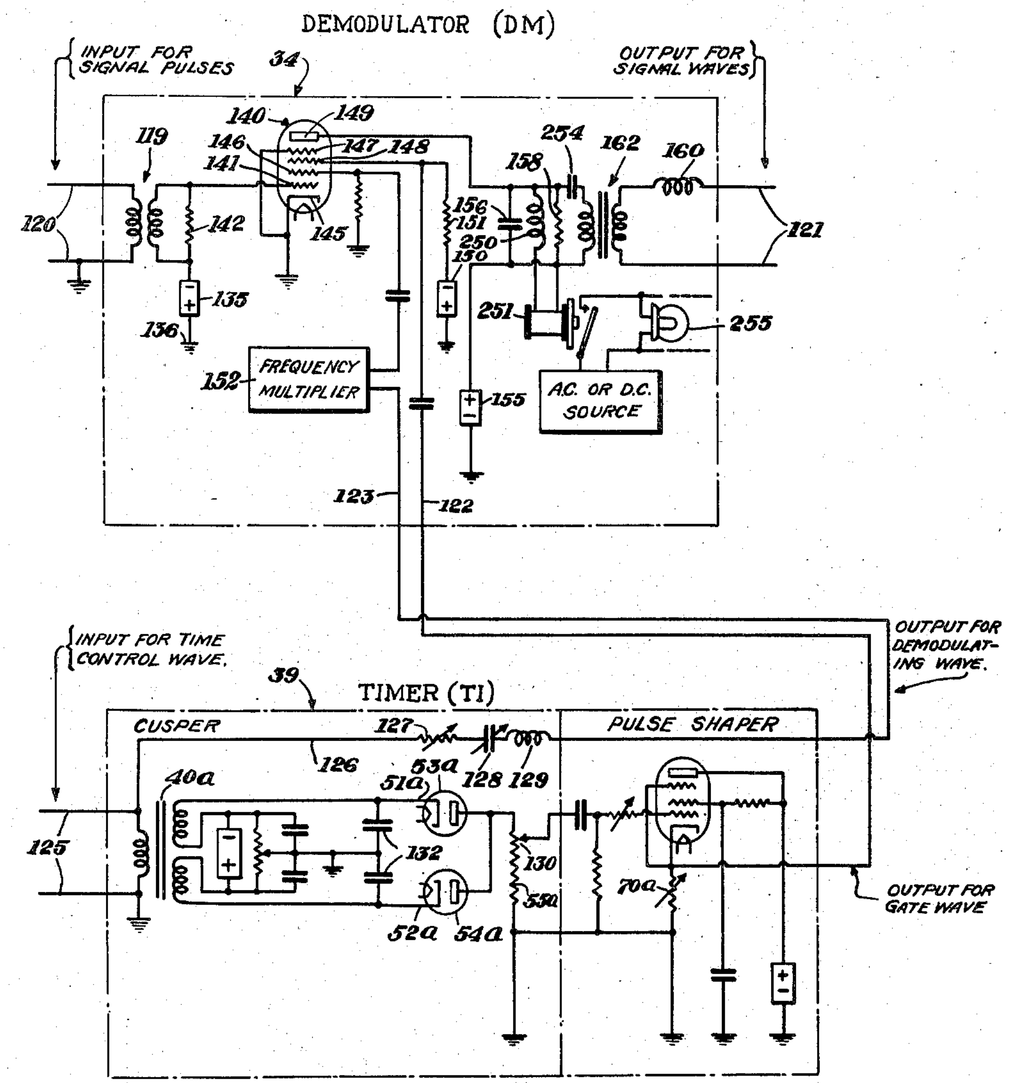
Fig. 4 is a schematic wiring diagram of a demodulator and timing circuit therefor adapted for selective reception of the pulses of a given channel separately from the pulses of other channels.

The demodulator 34 shown in Fig. 4 translates the intelligence conveyed by time modulated pulses into amplitude modulated waves for detection in the usual manner. The demodulator is provided with input terminals 120 for an input transformer 119, and output terminals 121 for the amplitude modulated signal waves. For use in multiplexing, the demodulator must be controlled to respond only to the pulses of a given channel. This may be accomplished by means of a gate wave and a demodulating wave applied to the demodulator circuit over input connections such as 122 and 123. The gate wave and demodulating wave are derived from a timer 39 having input terminals 125 for a time control wave such as the wave tw of Fig. 3.

The timer 39 includes two units, a cusper and a pulse shaper. The cusper unit is quite similar to that of the cusper modulator in Fig. 2, but differs therefrom in several respects, such as by the omission of the amplitude limiter AL and the modulating signal wave input, and by the addition of circuit 126. The circuit 126 includes a variable resistor 127, a variable capacitor 128 and an inductor 129 in series, the circuit being connected at one end with the primary of transformer 40a and connected at the other end by line 123 to the demodulator 34. A slider 130 is provided on the cusper output resistor 55a to vary the output voltage. The tuning capacitance connected between the rectifier cathodes 51a and 52a includes two equal capacitors 132 in series, the junction of the capacitors being grounded. A single capacitor may be employed as in Fig. 2 by omitting the ground connection.

The shaper of Fig. 4 has the same circuit as that in Fig. 2, but may be, if desired, of the form shown in Fig. 6 described hereinafter. The output resistor 70a of the pulse shaper is connected by line 122 to the demodulator 34.

The demodulator 34 includes a vacuum tube 140 having a control grid 141 to which signal pulses are fed through the transformer 119. A grid leak 142 is shunted across the secondary of the transformer through a source of negative potential 135 to ground 136. As will be made clear hereinafter, the transformer 119 operates as a differentiator for translation of the signal pulses into sharp impulses of a character more easily segregated from the signal pulses of adjacent channels. The tube 140 has a cathode 145 connected to ground, three additional grid elements 146, 147 and 148 and an anode 149. To the screen grid 146 is coupled the line 123 for impressing thereon the demodulating wave obtained from the primary winding of transformer 40a through circuit 126. Suppression grid 147 is connected to the cathode 145. The grid element 148 is coupled to line 122 over which the gate wave is received from the timer 39. The grid element 148, however, is connected through a high resistance leak resistor 151 to a source of negative voltage 150 which maintains the tube 140 normally biased to cut-off so that the energy of the signal pulses on grid 141 and the demodulating wave energy on the screen grid 146 will be insufficient to cause the tube to pass current until they coincide together with pulse energy of the gate wave on grid element 148.

A by-pass condenser 156 shunting the output circuit of anode 149 provides a path of relatively low impedance for components of a frequency above those of the signal waves. A resistor 158 in shunt with the primary of the output transformer 162 damps the output circuit to prevent or reduce objectionable transient oscillations which might otherwise result from shock excitation of the circuit by components of the pulses. An inductive reactance 160 may be connected in series with the secondary of the output transformer 162 for still further reducing the output of undesired high frequency components above the signal wave frequency if desired. It will be understood that any suitable low-pass circuit means may be provided in either the primary or secondary transformer for accomplishing a similar result.

While the time control wave for the timer 39 may be used as the demodulator wave for the demodulator 34, it is preferred to pass the time control wave of circuit 126 through a known tuned amplifier 152 whereby a suitable harmonic of the time control wave is obtainable. It is preferable to employ as high a harmonic as possible in order to obtain the advantage of a steeper slope upon which the signal pulses and the gate pulses are to be superimposed for translation of the time modulation of the signal pulses into effective amplitude modulated pulses as will be seen by reference to Fig. 5.

Figure 5:
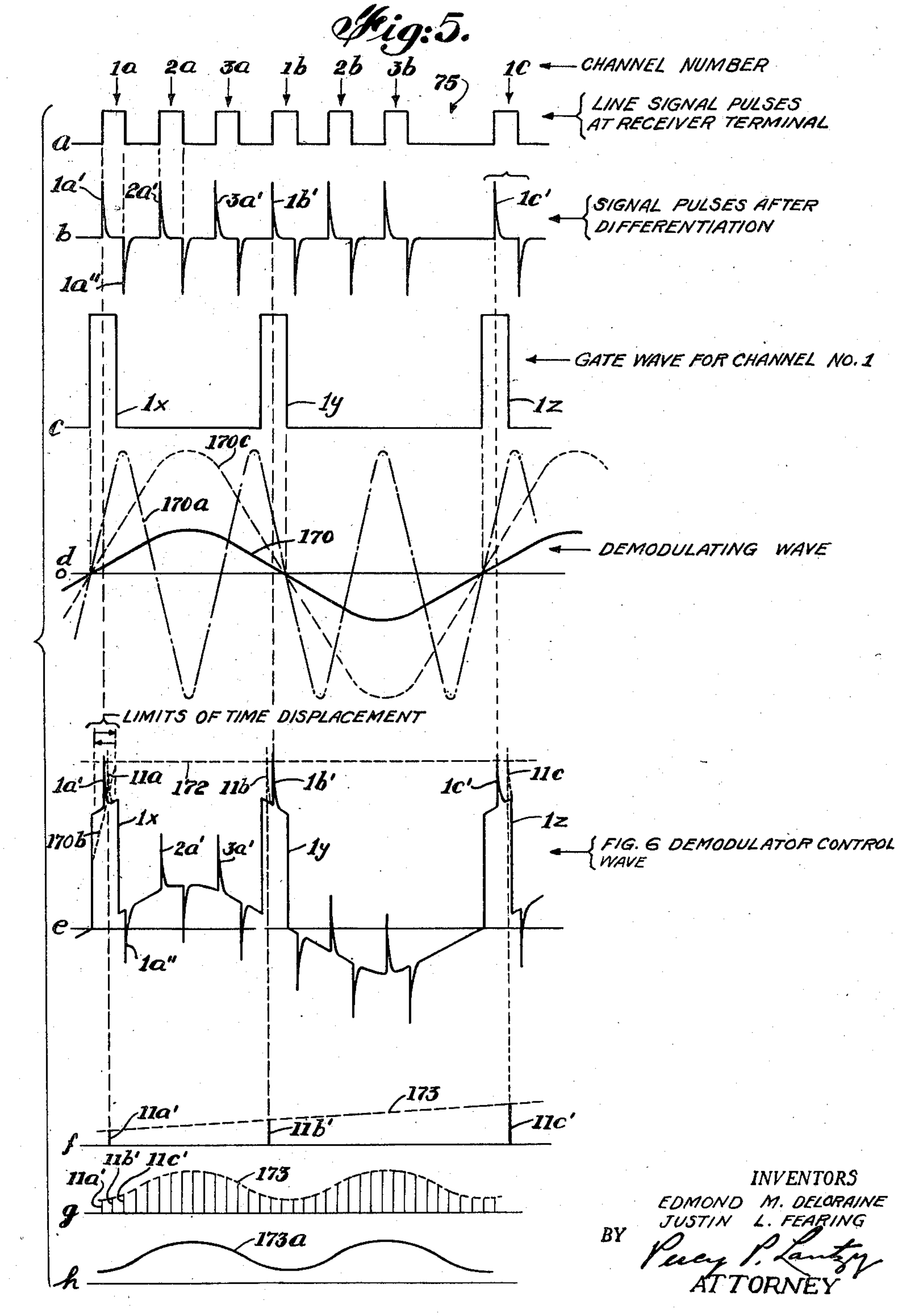
Fig. 5 is a graphical illustration of a set of curves useful for explaining the operation of the demodulator and timing circuit of Fig. 4.

Curve a of Fig. 5 shows a series of line or channel signal pulses for a system having three channels. The curve a shows six pulses in a group separated by a monitoring interval 75 from the first pulse of the next group the same as in curve e of Fig. 3. Curve b shows the signal pulses after differentiation by the input transformer 119, each signal pulse such as 1a being thereafter represented by two impulses, one positive and the other negative, such as 1a′ and 1a″. Curve c shows a series of gate wave pulses 1x, 1y and 1z in such alignment with the channel pulses of curve a as to pass those pulses representing channel 1. As for other channels, gate waves similar to that shown in curve c are each aligned or synchronized with the pulses of the particular channel to be received by the corresponding demodulator. Curve d shows, for purposes of illustration, a demodulating wave 170 such as would be obtained from the primary of transformer 40a, and which corresponds directly to the frequency of the time control wave used for the three-channel system. This wave is of such phase relation to the gate wave and the pulses in channel No. 1 as to align the sloping portions thereof with the gate pulses and the signal pulses of channel 1. For the most effective translation of the timed modulation of the signal pulses into amplitude modulated pulses, a much higher frequency wave is preferred. This is desirable because the side slopes of each undulation of the higher frequency wave are much steeper as is clear from a comparison of the waves 170a with wave 170. When the gate pulses and the signal pulses are superimposed thereon, it will be clear that the steeper the slope, the greater is the amplitude variation obtainable for a given amount of pulse displacement. For a further understanding of the principles of demodulation of time modulated pulses, reference is made to a copending application of D. D. Grieg, Serial No. 459,959, filed September 28, 1942, now U. S. Patent No. 2,416,306, granted Feb. 25, 1947.

The different wave potentials applied to the grid elements of the demodulator tube include the impulses of curve b, the gate wave of curve c and the demodulating wave 170, 170a or such other frequency wave as may be desired. Curve e shows these different wave potentials combined to illustrate the gate and the threshold clipping functions of the tube 140 of Fig. 4. The normal negative D. C. bias on the grid element 148 may be adjusted so that anode current begins to flow when the positive signal impulses reach a predetermined amplitude such as the threshold level 172. With this adjustment, anode current is produced in the tube 140 only for brief intervals corresponding to the peaks of signal impulses 1a', 1b', etc., the amplitude of the energy passed by the tube being substantially directly in proportion to the amount of displacement of the signal impulses from their unmodulated positions. It will be seen that the top edges of the gate wave pulses in curve e are sloped according to that of the portion of the demodulating wave upon which the gate pulses are superimposed. For most purposes, the frequency of the time control wave such as represented by wave 170 is not sufficiently high to provide steep enough sides for satisfactory demodulation. This as hereinbefore stated, may be overcome by using the tuned amplifier 152 to obtain a high odd harmonic from the wave 170. The harmonic 170a for example, is illustrative of this principle, the steepness of the side slopes thereof being indicated at 170b in graph e for comparison with the top slope of gate pulse 1x.

To summarize the operation of the demodulator of Fig. 4, the anode current of tube 140 is normally blocked by the negative bias on grid element 148. When a gate pulse such as pulse 1x of curve c, Fig. 5, is applied, the negative bias on the control grid is reduced to such a value that the peak of the signal impulses will cause appreciable anode current to flow through the tube. The grid voltage, of course, is varied at the same time by the demodulating wave 170 or 170a as the case may be. Thus, the gate pulses operate to open the demodulator for reception of signal impulses. The demodulating wave produces the desired slope effect by which the time displacements of the signal impulses are translated linearly into amplitude modulated pulses. Since the signal impulses are all of uniform amplitude, the effect of a time modulation of the impulses is to vary the effective amplitude of the anode current of tube 140 in proportion to the time modulation or displacement of the signal impulses. Thus, for illustration purposes, let it be assumed that the time modulations applied to impulses 1a', 1b' and 1c', graph e, Fig. 5, are progressively greater as indicated by the broken line positions 11a, 11b and 11c. The resulting anode current for such modulation of the signal impulses would be substantially as indicated by the impulses 11a', 11b' and 11c' of curve f. These impulsse of curve f represent in amplitude variations the time displacement between impulse positions 1a' to 11a; 1b' to 11b; and 1c' to 11c, and the line 173 represents the envelope defined by the anode current impulses.

It will be understood that these curves greatly exaggerate the relative proportions since there are for a 6 k.c. system, 12,000 signal impulses per second. To represent more clearly the envelopes defined by these impulses, curve g is provided at a reduced scale with three of the impulses thereof selected as representing impulses 11a', 11b' and 11c' of curve f. Audio detection of the signal impulses of curve g is represented by the resulting wave 173a.

The advantage of differentiating the input signals before they are applied to the control grid is that differentiation makes it possible in some cases to reduce the width of the gate opening to approximately 50 per cent of that necessary for allowing for the passage of undifferentiated pulses. This result will be understood from the fact that a very sharp differentiated pulse may be produced to represent the response producing edge, such as the leading edge of the signal pulse, and that it is necessary for the gate to be open only wide enough to equal the duration of the sharp pulse plus an interval corresponding approximately with the maximum time displacements caused by modulating signals.

By differentiating the signal pulses and reducing the time width of the gate pulses, an advantage results that the signal-to-noise ratio may be considerably reduced as compared with that obtained when the undifferentiated pulse is applied directly to the control grid. From another point of view, an advantage results from the fact that the system operates at the received end of the line as though the line had satisfactorily transmitted pulses of shorter duration and correspondingly higher signal-to-noise ratio than the particular line may have been capable of satisfactorily transmitting. In other words, if a given line be adapted for transmitting a pulse of certain minimum duration, the receiver may be made to respond by differentiation to a considerably shorter pulse than the line was capable of effectively transmitting. An advantage of transmitting the longer duration pulse than that employed at the receiver after differentiation, it that more signal energy may be transmitted at a fixed amplitude than if pulses of the very short duration were actually transmitted on the line. Thus there would generally be less likelihood of the maximum signal amplitude falling below the desired value by the time it reaches the receiver.

It will be understood that the sensitivity of response of the demodulator increases with increase of slope of the demodulating wave and that the slope may be increased by either of two methods. One by increasing the amplitude of the demodulating wave as indicated at 170b, the D. C. negative bias and the gate wave applied to the grid, of course, being correspondingly increased. The other method as hereinbefore described is to employ a higher odd harmonic of the channel timing wave as indicated by wave 170a, provided the minimum gate opening required for passing signal pulses does not extend over such a large fraction of the demodulating wave cycle that the portion of demodulating wave within the limits of the gate opening departs appreciably from a straight line or departs sufficiently therefrom to introduce objectionable distortion in the demodulating operation.

Figure 6:
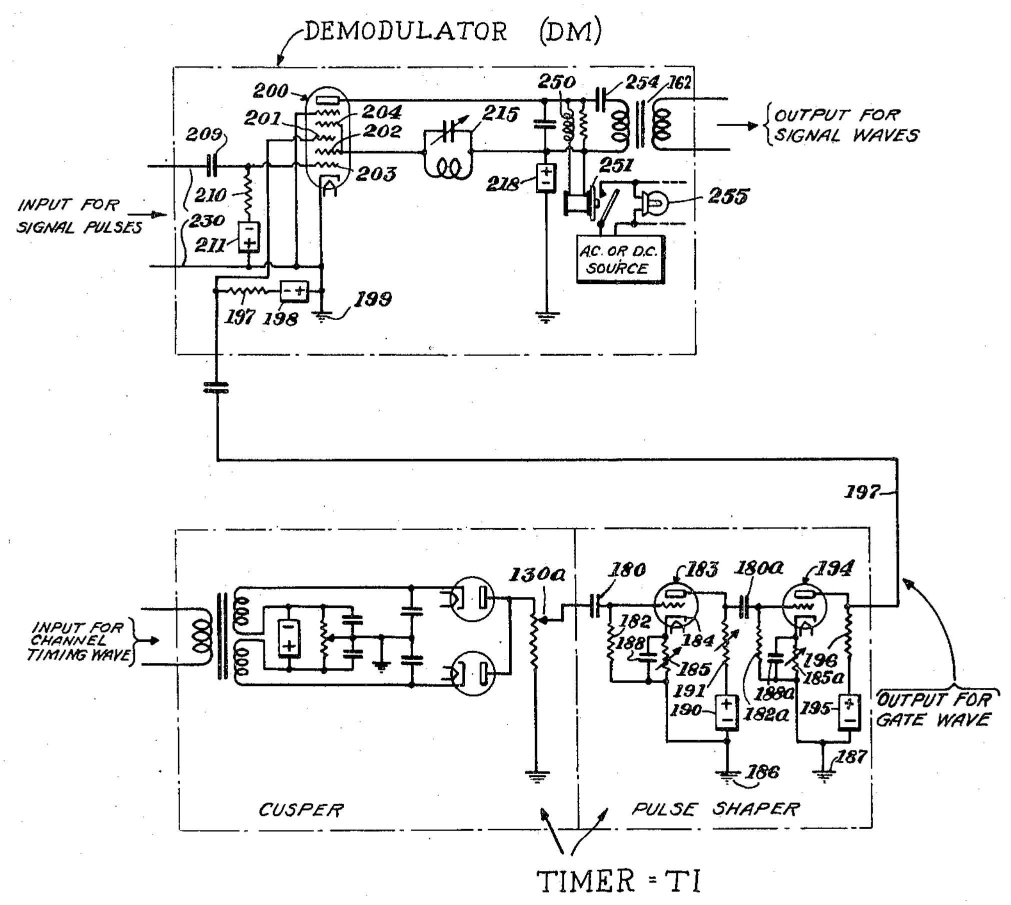
Fig. 6 is a schematic wiring diagram of a modified form of demodulator and timing circuit.

The demodulator and timer of Fig. 6 may be substituted for that of Fig. 4. The timer includes a cusper unit and a pulse shaper unit as in Fig. 4, the cusper being of the same design but the shaper differing by having a two-stage amplifier. The input of the shaper includes low impedance blocking condenser 180 as shown and a grid leak resistance 182. The cathode 184 of the first tube 183 is connected through a variable resistor 185 with the negative terminal of the anode current source 190 which is also grounded at 186. The cathode resistor 185 is shunted by a low impedance by-pass condenser 188 to prevent feed-back of current variations from the output to the input circuits. The anode current source is connected through a variable resistor 191 with the anode of tube 183, the resistor serving as a coupling resistor between the tubes. Resistors 182*a* and 185*a* and condensors 180*a* and 188*a* in the grid circuit of tube 194 correspond respectively with resistors 182 and 185 and condensors 180 and 188 in the grid circuit of tube 183. The cathode of the second tube 194 is connected to the negative terminal of current source 195 and also grounded at 187. The positive terminal of the source 195 is connected through an output resistor 196 with the anode of the second tube 194. The output connection 197 across the resistor 196 is coupled to a grid element 201 of the demodulator vacuum tube 200. The grid element 201 is provided with a grid resistor to which is applied a negative bias 198 of sufficient value to normally maintain the tube 200 at cut-off, similarly as in the case of the negative bias of 150 on tube 140 in Fig. 4.

The demodulator of Fig. 6 is provided with input and output terminals the same as in demodulator of Fig. 4. The tube may be of the 6L7 pentagrid converter type. The input for signal pulses is shown connected between grid 203 and ground 199, the grid being coupled by the low impedance blocking condenser 209 with the upper line conductor and having a grid leak 210 and negative potential source 211. The cathode and suppressor grid of tube 200 are connected to ground 199. Grid elements 202 and 204 are connected together and through tuned circuit 215 to the positive terminal of the anode current source 218.

It will be noted that the Fig. 6 demodulator is shown as though the transformer 119 of Fig. 4 were omitted thus applying the signal pulses without differentiation directly to the control grid of the tube. Such arrangement would require that the gate pulse be made correspondingly wider than in the case of Fig. 4 in order to accommodate the passage of the line pulses 1*a*, 1*b*, 1*c*, etc., Fig. 5. It will be understood, however, that the transformer 119 of Fig. 4 may be placed in the input 230 of Fig. 6, in which case, differentiated pulses will be applied to the control grid and the gate wave may then be made of the same width as in the case of Fig. 4.

In adjusting the pulse shaper of Fig. 6 for control of the gate pulses, the maximum duration of the gate pulses may be obtained by adjusting the cathode resistor 185 which controls the cut-off level at which the base of the input wave is clipped. By raising the slider 130*a* on the output of the cusper, the width of the gate may be increased and by lowering the slider the gate may be narrowed. In order that the gate wave may have as nearly a rectangular shape as possible, the slider of the cusper output resistor is preferably adjusted near its uppermost position with the cathode resistor 185 properly adjusted to provide the desired gate width. The resistor 191 is then adjusted to vary the clipping level at the top of the output gate wave to provide a gate wave of proper amplitude with relation to the blocking bias normally acting on grid 201 of the demodulator, so that the desired signal impulses superposed upon the top of the gate wave pulses, produce anode current as hereinbefore described.

The demodulator tuned circuit 215 is made resonant to the frequency of the time control wave or preferably to an odd harmonic thereof, thereby providing a demodulating wave frequency such that a substantially linear slope of proper steepness is provided at the top of each gate pulse.

The incoming signal pulses are applied to grid 203, those pulses of the proper channel being in proper timing with the gate pulses. Resonant oscillations are set up in circuit 215 by shock excitation as when the tube 200 conducts anode current in response to signal pulses, the initiation of which may be brought about by decreasing the negative bias at 198. These oscillations are used as the demodulating wave since the amplitude thereof is directly related with the degree of time modulation of the signal pulses. This, as explained in the aforesaid Grieg application, Serial No. 459,959, results in a substantially true translation of the time displacement of each signal pulse into corresponding amplitude for an output pulse.

The demodulators and timers of Figs. 4 and 6 may be employed for the reception of time modulated pulses in systems other than those utilizing a double pulse subjected to push-pull displacement. For example, the demodulators and timers may be used in the case of a time modulated pulse system wherein all pulses in any one channel have equal spacings between the average positions of successive pulses and the gate openings are equally spaced apart.

*Signalling*

In addition to the speech frequency input, the modulator and demodulators of the multiplex system may be provided with input and outputs respectively, for direct current ringing, code, or other signals of a period longer than that of the lowest utilized speech frequency component. In Fig. 2, a D. C. signal input circuit 240 is connected across the upper potentiometer condenser, the circuit being traced from the upper terminal of the potentiometer to the manually operable lever of the key 242 and to the armature of the relay 243 and from the back contacts of the key and relay through resistor 241 to ground. The time constant of resistor 241 in combination with the upper potentiometer condenser 45 and its connected circuits is preferably slightly greater than the period of the lowest utilized speech frequency component. The relay coil may be energized by any suitable A. C. current circuit 245 such as a telephone ringing control circuit for use with the telephone channel, or may be energized by any desired circuit for sending low frequency D. C. signals, such as a telegraph channel. The manual key 242 may be closed to send a signal or code message to an operator at the distant end of the channel.

Referring to Figs. 4 and 6, the anodes of the tubes of the demodulator circuits each connects conductively through an inductor or choke coil 250 in series with the coil of a marginal slow acting relay 251. The main output for speech frequency waves in each circuit includes a transformer 162 whose primary is connected at one end by a blocking condenser 254 with the anode, the other end being connected directly with the positive terminal of the anode current source, so that the main output transformer is capacity coupled across the relay and choke coil which acts as a relatively high impedance to the speech frequency waves.

The relay when operated closes its contacts to light the supervisory lamp 255 or to operate some other signal for the terminal supervisory operator, and/or to transmit a ringing current or ringing control current for use in conjunction with the telephone circuit of the channel. The relay is preferably designed to have a minimum response period slightly longer than that of the lowest utilized speech frequency component, and is adjusted to respond to closure of the modulator signal key or relay contacts when the demodulator is properly aligned with the incoming channel pulses, but is adjusted to be non-responsive to the anode current produced by unmodulated pulses.

While we have shown and described specific circuits and certain variations thereof, we realize that many additional circuit arrangements and variations are possible without departing from the invention. It is to be understood therefore, that the embodiments herein shown and described are to be regarded as illustrative of the invention only and not as restricting the scope of the invention as set forth in the objects and the appended claims.

We claim:

1. In a receiver for selective reception of a channel of communication from a multi-channel train of signal pulses, the pulses of at least the desired channel being modulated in time relative to a given recurrence timing according to signal intelligence, a multi-grid vacuum tube having a plate-cathode output circuit, means to apply the input signals to a grid of said tube, means to bias a grid of said tube to threshold clip at a given voltage level, means for applying to a grid of said tube an oscillatory wave in synchronism with said given recurrence timing, means for applying to another grid of said tube substantially rectangular pulses timed to coincide with pulses of said desired channel, the composite energy of said wave and said rectangular pulses resulting in pulse portions having a voltage variation according to the corresponding wave portions which, when combined with signal pulses exceeds said given voltage level, whereby coincidence between said pulse portions and the signal pulses of said desired channel produces current flow in said output circuit proportional to the time modulation of such signal pulses.

2. In a receiver for time modulated signal pulses, valve means for passing current when the voltage applied thereto exceeds a given voltage level, means to produce, in application to said valve means, energy having pedestal-like pulse portions timed to coincide with a received train of time modulated signal pulses, said pulse portions having a voltage variation characteristic, the energy of which, when combined with said signal pulses exceeds said given voltage level to produce current flow through said means proportional to the time modulation of said signal pulses, said means for producing energy having pedestal-like portions including means for producing an oscillatory wave in synchronism with the average recurrence rate of said signal pulses and means for producing substantially rectangular pulses in coincidence with said signal pulses.

3. In a receiver for time modulated signal pulses, valve means for passing current when the voltage applied thereto exceeds a given voltage level, means to produce, in application to said valve means, energy having pedestal-like pulse portions timed to coincide with a received train of time modulated signal pulses, said pulse portions having a voltage variation characteristic, the energy of which, when combined with said signal pulses exceeds said given voltage level to produce current flow through said means proportional to the time modulation of said signal pulses, said means for producing energy having pedestal-like portions including means for producing substantially rectangular pulses timed to coincide with said signal pulses and a resonant circuit associated with said valve means for shock excitation each time said valve means passes current, whereby said resonant circuit applies to said valve means oscillatory energy for combining action with said rectangular and signal pulses.

4. In a receiver for selective reception of a channel of communication from a multi-channel train of signal pulses, the pulses of at least the desired channel being modulated in time relative to a given recurrence timing according to signal intelligence; a method comprising producing substantially rectangular pulses in coincidence with the pulses of the desired channel, producing an oscillatory wave in synchronism with said given recurrence timing, combining portions of said wave with said rectangular pulses to produce pulse portions having voltage variation according to corresponding portions of said wave, applying said pulse portions to said train of signal pulses for coincidence with the pulses of said desired channel, thereby producing voltage potentials varying in amplitude according to the time modulation of said signal pulses, and producing current flow corresponding to said voltage potentials.

5. A method for receiving time modulated pulses, comprising producing substantially rectangular pulses in coincidence with said time modulated pulses, producing an oscillatory wave in synchronism with the average recurrence timing of said modulated pulses, combining portions of said wave with said rectangular pulses to produce pulse portions having voltage variation according to corresponding portions of said wave, and applying said pulse portions to the received time modulated pulses for coincidence therewith, thereby producing voltage potentials varying in amplitude according to the time displacements of said modulated pulses.

6. A method of receiving signal pulses push-pull modulated in time according to signal intelligence, producing pedestal-like pulses having a voltage variation characteristic, the voltage variations of successive pulses being oppositely disposed, and causing said pedestal-like pulses to coincide with said time modulated pulses, said voltage variations coacting with said signal pulses to produce voltage potentials varying in amplitude according to the time displacements of the signal pulses.

EDMOND M. DELORAINE.
JUSTIN L. FEARING.

(References on following page)

REFERENCES CITED

The following references are of record in the file of this patent:

UNITED STATES PATENTS

| Number | Name | Date |
|---|---|---|
| 2,199,634 | Koch | May 7, 1940 |
| 2,379,899 | Hansell | July 10, 1945 |
| 2,391,776 | Fredendal | Dec. 25, 1945 |
| 2,413,023 | Young | Dec. 24, 1946 |
| 2,416,306 | Grieg | Feb. 25, 1947 |
| 2,418,116 | Grieg | Apr. 1, 1947 |